(12) United States Patent
Hintze et al.

(10) Patent No.: US 8,118,520 B2
(45) Date of Patent: *Feb. 21, 2012

(54) DRILLING DEVICE WITH DISPLACEMENT DEPENDENT SPRING AND/OR DAMPER

(75) Inventors: Wolfgang Hintze, Hamburg (DE); Rolf Clausen, Norderstedt (DE); Martin Plucinski, Asendorf (DE); Enno Stover, Hamburg (DE); Friedrich Meissner, Hamburg (DE)

(73) Assignee: Airbus Deutschland GmbH, Hamburg (DE)

( * ) Notice: Subject to any disclaimer, the term of this patent is extended or adjusted under 35 U.S.C. 154(b) by 1112 days.

This patent is subject to a terminal disclaimer.

(21) Appl. No.: 11/950,028

(22) Filed: Dec. 4, 2007

(65) Prior Publication Data

US 2008/0124181 A1 May 29, 2008

Related U.S. Application Data

(63) Continuation-in-part of application No. 10/785,900, filed on Feb. 23, 2004, now Pat. No. 7,347,651.

(51) Int. Cl.
*B23B 45/14* (2006.01)
*B23B 47/44* (2006.01)

(52) U.S. Cl. ............ 408/67; 408/97; 408/112; 408/712; 408/130

(58) Field of Classification Search ............ 408/67, 408/97, 95, 110, 111, 112, 712
See application file for complete search history.

(56) References Cited

U.S. PATENT DOCUMENTS

| | | | |
|---|---|---|---|
| 1,647,396 A | 11/1927 | Decker | |
| 2,488,992 A | 11/1949 | Taylor | |
| 2,837,939 A * | 6/1958 | Leitner et al. | 408/110 |
| 2,883,891 A | 4/1959 | Shulters et al. | |
| 2,994,235 A | 8/1961 | Rise | |
| 3,077,547 A | 2/1963 | Metko | |
| 3,779,663 A * | 12/1973 | Ruggles | 408/113 |
| 3,833,313 A * | 9/1974 | Gallion | 408/112 |
| 4,097,176 A | 6/1978 | Wanner et al. | |
| 4,179,231 A * | 12/1979 | Hadden | 408/112 |
| 4,227,839 A * | 10/1980 | Conway | 408/16 |
| 4,242,016 A | 12/1980 | Faris | |
| 4,250,971 A | 2/1981 | Reibetanz et al. | |
| 4,534,682 A | 8/1985 | Carlson | |
| 4,652,184 A | 3/1987 | Fischer | |
| 4,752,161 A | 6/1988 | Hill | |
| 4,764,060 A | 8/1988 | Khurana | |
| 4,810,137 A * | 3/1989 | Yang | 408/100 |
| 5,033,917 A | 7/1991 | McGlasson et al. | |
| 5,071,293 A | 12/1991 | Wells | |

(Continued)

FOREIGN PATENT DOCUMENTS

AT 350778 6/1979

(Continued)

*Primary Examiner* — Daniel Howell
*Assistant Examiner* — Paul M Janeski
(74) *Attorney, Agent, or Firm* — Kelly & Kelley, LLP

(57) ABSTRACT

In order to improve a device for a drilling machine in such a way that manual drilling can be carried out with optimum conditions, it is proposed that the device include a workpiece jigging device, a guide device for the guidance of the machine when there is a displacement of the workpiece jigging device, and a control device for the control of the feed displacement of the workpiece jigging device and the machine. The control device has combinations of impact dampers and/or springs to achieve control over the feed displacement.

31 Claims, 9 Drawing Sheets

U.S. PATENT DOCUMENTS

| | | | |
|---|---|---|---|
| 5,096,342 A | 3/1992 | Blankenship et al. | |
| 5,129,467 A | 7/1992 | Watanabe et al. | |
| 5,238,336 A | 8/1993 | Sanders et al. | |
| 5,356,245 A * | 10/1994 | Hosoi et al. | 408/56 |
| 5,688,082 A | 11/1997 | Richardson | |
| 5,988,954 A | 11/1999 | Gaskin et al. | |
| 5,993,122 A | 11/1999 | Baker | |
| 6,200,075 B1 | 3/2001 | Gaskin et al. | |
| 6,247,879 B1 * | 6/2001 | Costa | 408/112 |
| 6,413,022 B1 | 7/2002 | Sarh | |
| 6,443,676 B1 | 9/2002 | Kopras | |
| 6,851,898 B2 | 2/2005 | Ege et al. | |
| 6,964,546 B1 | 11/2005 | Vakil | |
| 7,347,651 B2 * | 3/2008 | Hintze et al. | 408/67 |

FOREIGN PATENT DOCUMENTS

| | | |
|---|---|---|
| AT | 383538 | 12/1986 |
| CH | 464649 | 10/1968 |
| CH | 544618 | 11/1973 |
| DE | 2238838 | 2/1974 |
| DE | 7724047 | 11/1977 |
| DE | 2705410 C2 | 8/1978 |
| DE | 2715378 A1 | 10/1978 |
| DE | 3324615 C2 | 5/1984 |
| DE | 3340090 A1 | 5/1985 |
| DE | 3509199 A1 | 10/1985 |
| DE | 3605204 A1 | 8/1987 |
| DE | 3835582 A1 | 4/1990 |
| DE | 4038941 A1 | 6/1992 |
| DE | 4313658 C1 | 6/1994 |
| DE | 19639122 A1 | 4/1998 |
| DE | 19860182 A1 | 7/2000 |
| DE | 10000015 | 7/2001 |
| EP | 0090929 B1 | 10/1983 |
| GB | 557254 | 11/1943 |

* cited by examiner

Fig. 3
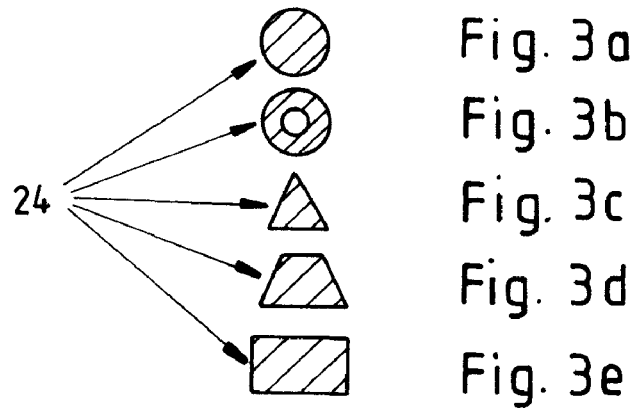
Fig. 3a
Fig. 3b
Fig. 3c
Fig. 3d
Fig. 3e
Fig. 4
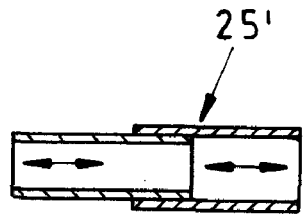
Fig. 5
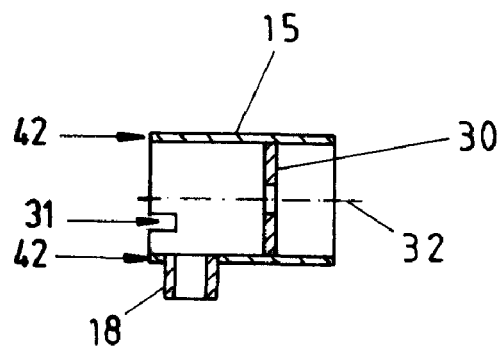
Fig. 6
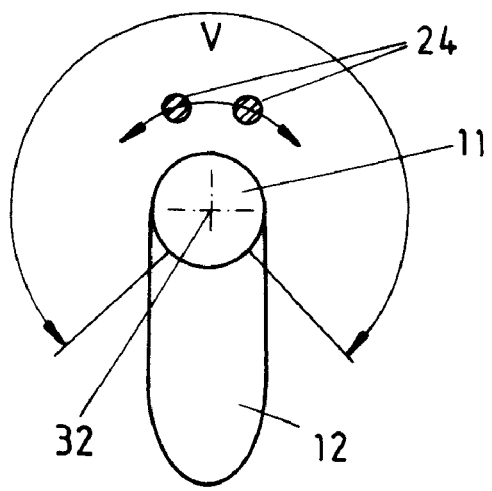

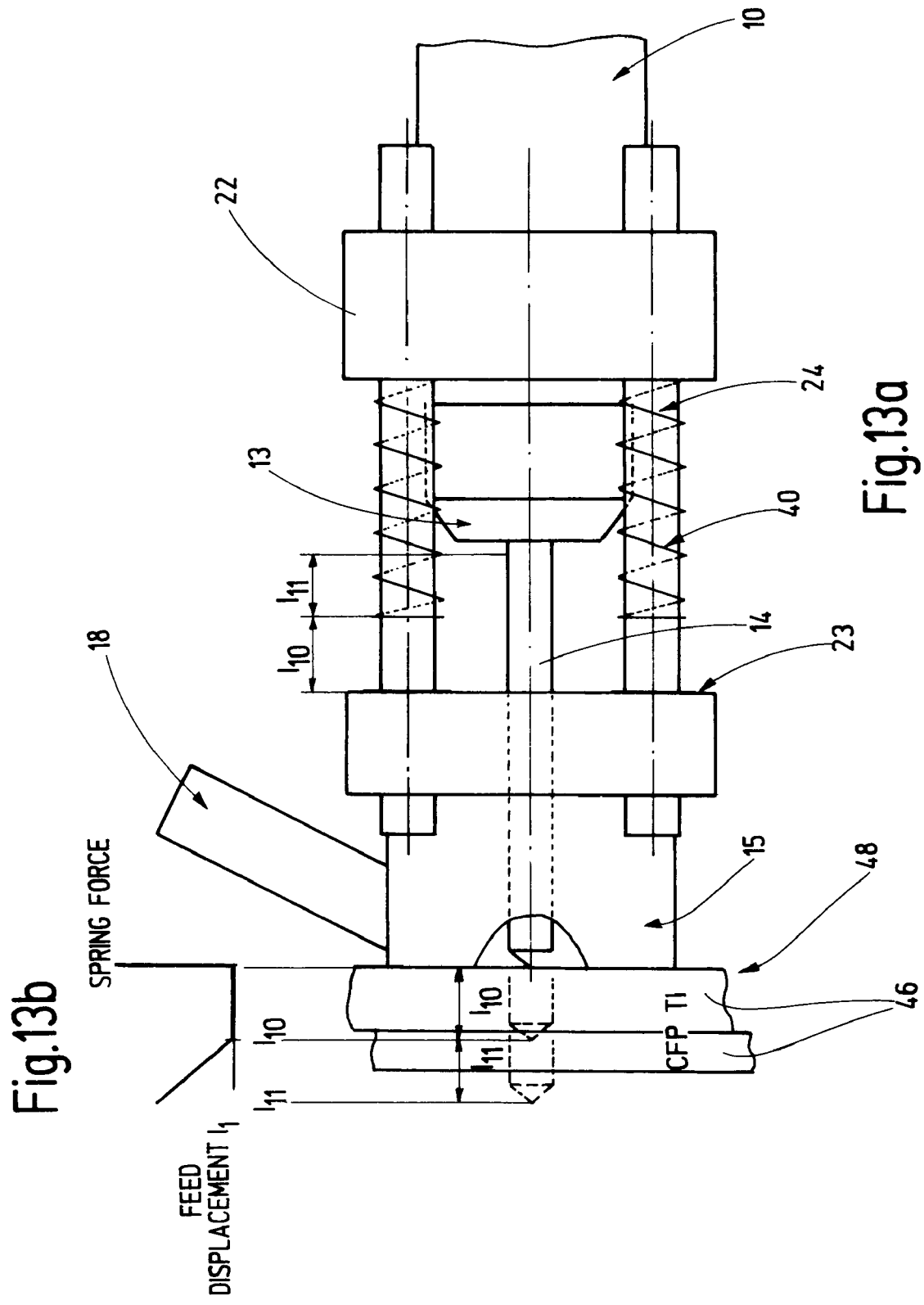

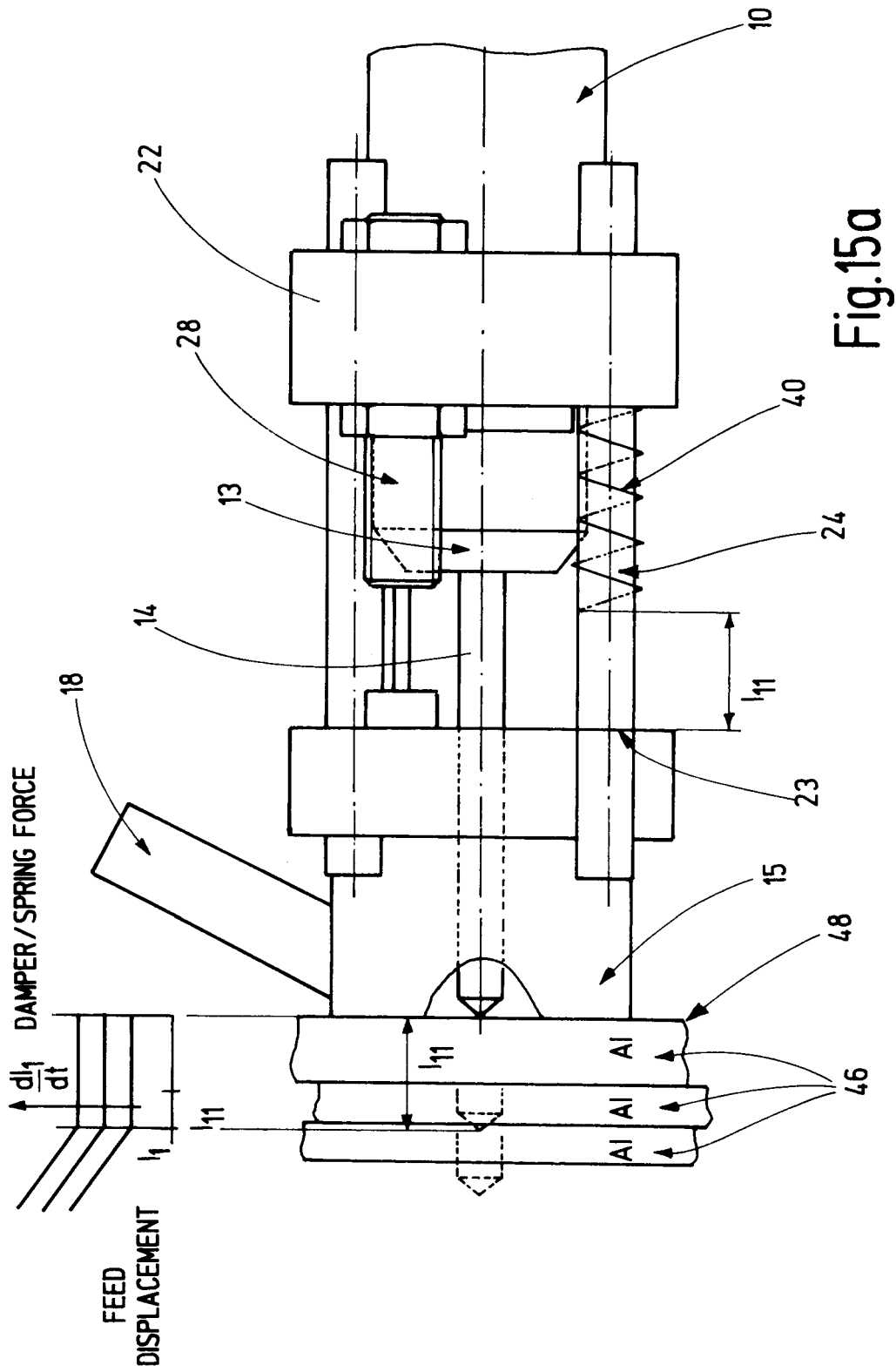

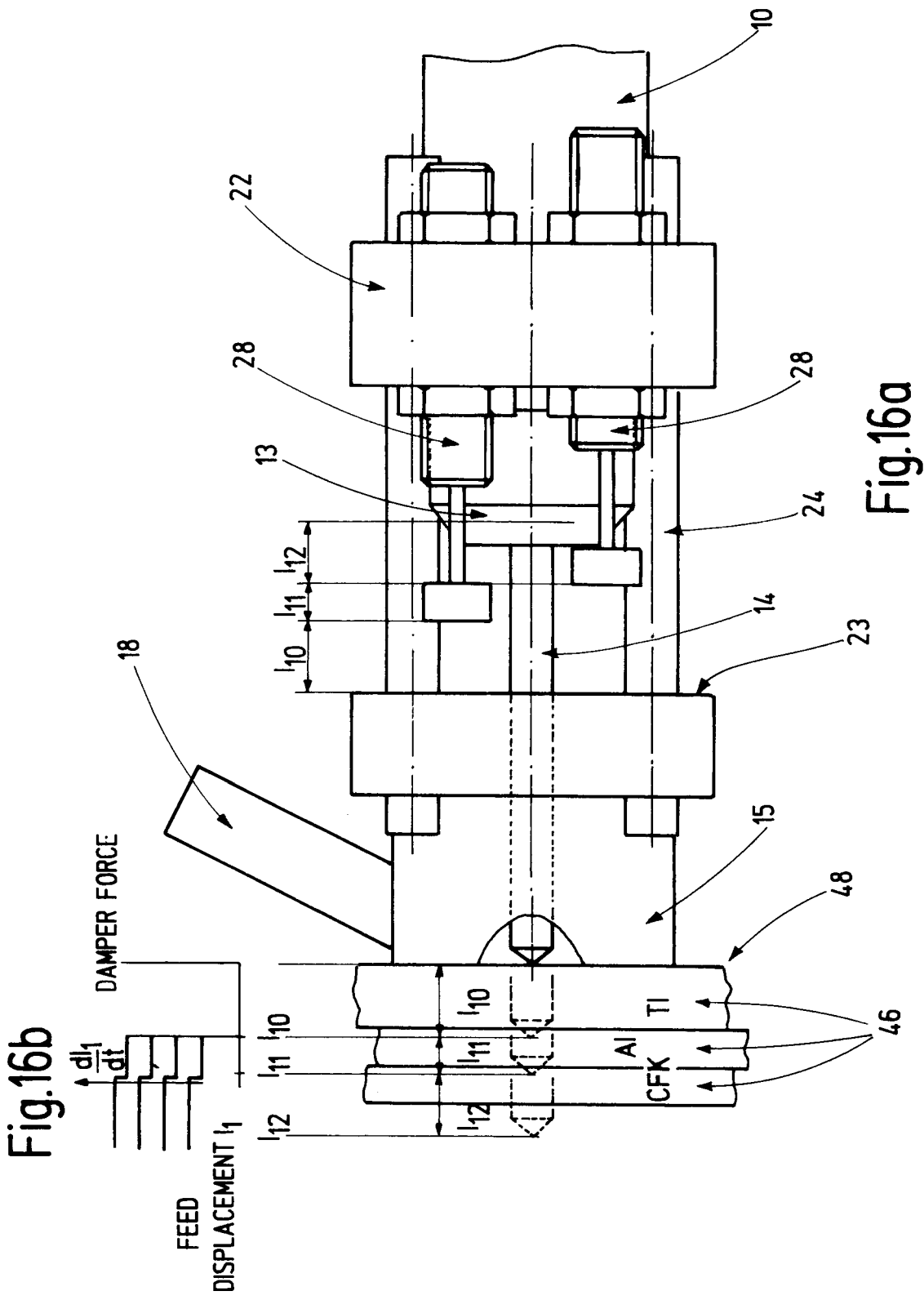

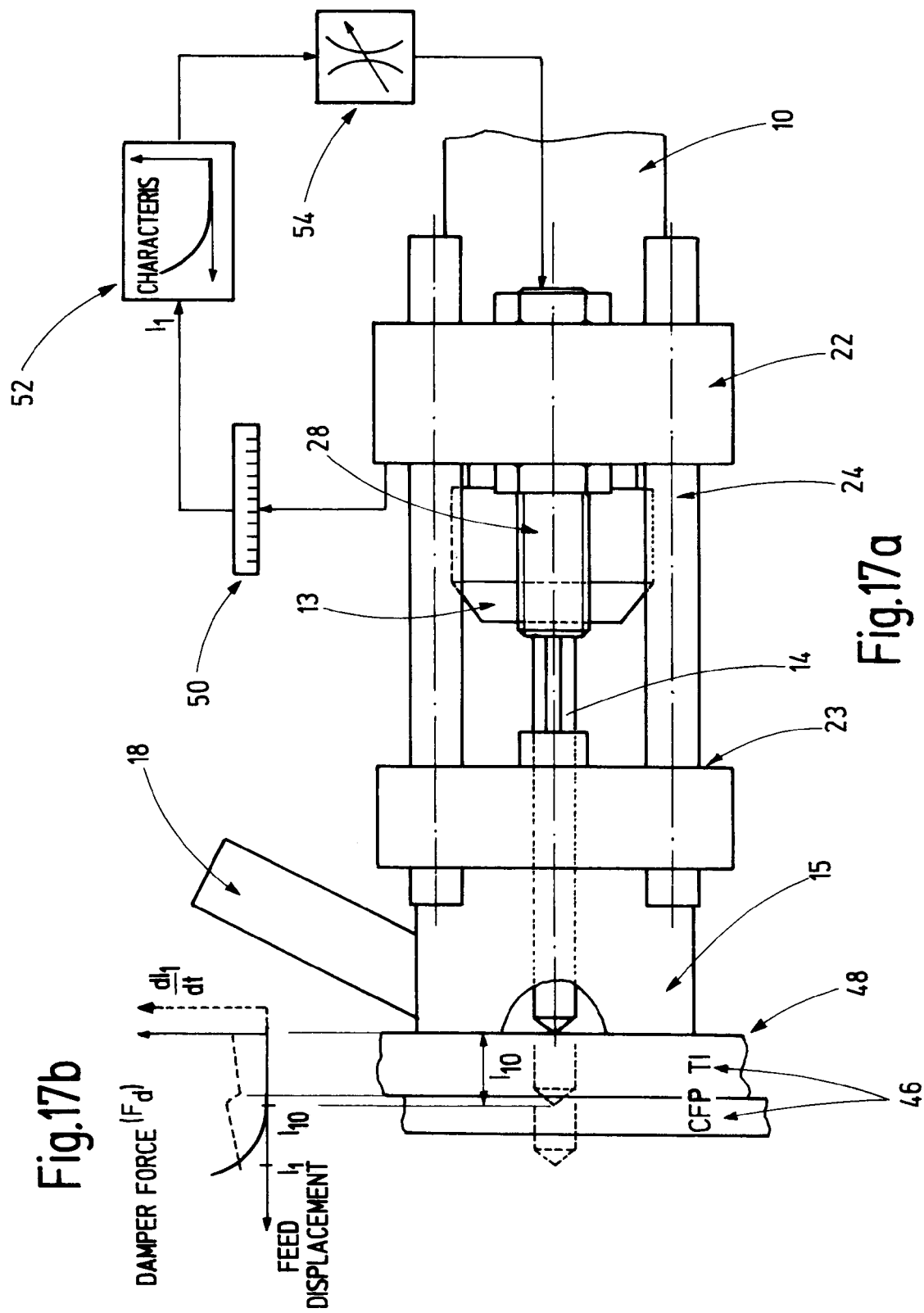

DRILLING DEVICE WITH DISPLACEMENT DEPENDENT SPRING AND/OR DAMPER

BACKGROUND OF THE INVENTION

The present invention relates generally to a device for guiding a manual drilling machine. More particularly, the present invention relates to a device for regulating the feed force of a manual drilling machine to avoid delamination, burs, and chips around a drilling site. The present invention also provides for the extraction of waste around a drilling site and a depth stop.

Devices are known for the suction-type extraction of chips and dusts arising during drilling, either adapted to the drilling machine (machine tool or manual drilling machine) or as a separate component (e.g. DE 4313658 C1, DE 2715378 C2, DE 3340090 A1, DE 4038941 C2, DE 10000015 A1, DE 3605204 A1, DE 3835582 A1, DE 19860182 C2).

Devices are known that provide a depth stop during manual drilling, either adapted to the drilling machine or as a separate component (e.g. DE 7724047 U1, AT 350778 B).

Devices are known that dampen the feed motion during manual drilling, either adapted to the drilling machine or as a separate component (e.g. DE 19639122 A1).

Devices are known that provide a depth stop and suction-type extraction of chips and dusts arising during the to the drilling process, either adapted to the drilling machine or as a separate component (e.g. DE 3509199 C2).

So-called stop holders are known, which guide drilling, counterboring and reaming tools during manual drilling (e.g. CH 464649 A). The contact surface can be over the full area or can be formed by three or four contact feet. The tool is clamped to a drilling machine via an interface with threads and a conical seat. The concentric running guide of the tool can be uncoupled via a pendulum shaft from the motion of the drilling machine. An adjustable depth stop can be included and the stroke path can be spring-loaded. The device is separable from the drilling machine. Drawbacks of such devices are the usually long distance between the drilling machine and the drilling site (the risk of tilting of the tool therefore exists despite the pendulum shaft) and the need for a tool with a threaded shaft (high consumption costs). Furthermore, no damping and no suction-type extraction is included with these devices.

Devices are known which guide drilling and reaming tools during manual drilling. Three- or four-legged drilling frames (integrated suction-type extraction is possible) are used, which include drill bushes of hardened steel adapted in each case to the tool diameter to be used. Machine, suction-type extraction, angular alignment and tool guide are two or three separate objects, which means that manipulation with two hands is required, which in turn makes skill and training or two workers a prerequisite. Furthermore, such devices do not include any damping. Moreover, expensive hardened drill bushes and very long tools (>120 mm) are required. Finally, a high noise level is generated by the suction-type extraction.

Hydraulically or pneumo-hydraulically operated drilling devices are known, with which a constant, ideally regulatable feed motion of the drilling tool is achieved pneumatically or hydraulically (e.g. AT 383538 B, CH 544618 A).

All of the mentioned devices are unable to provide simultaneously guidance of the tool (guarantee of roundness, cylindricity and squareness), a depth stop, damping and suction-type extraction with a manual machining process.

Essential problems of manual drilling with the known devices that need to be solved arise on account of an unregulated feed force. This particular feature of manual drilling often leads to delamination (working loose of individual fibers from the bonding resin) when machining fiber composite materials or laminated composite materials (e.g. CFRP (carbon-fiber reinforced plastics), FRP (fibrous-glass reinforced plastics), AFRP (aramid-fiber reinforced plastics), Glare (glass fiber reinforced aluminum), derived timber products), as well as to increased burr formation when machining metal materials (e.g. aluminum, steel, titanium). Furthermore, on account of the manually controlled feed in the manual process, the tool has a tendency to become screwed at the tool exit through the material. This in turn often leads to tool breakages, precisely in the case of small tool diameters.

Apart from the unregulated feed, hand-guided machining is a further problem, as a result of which non-round holes, with which the required tolerances are not met, can arise. Furthermore, the manual guidance can lead to non-compliance with the squareness of the hole to the workpiece surface.

Chips and dusts generally arise during the cutting of materials, as a result of which the use of suction-type extraction may be required, In particular in the case of dusts hazardous to health. This can however lead to high noise levels if the geometry of the suction-type extraction device is not designed in the optimum manner.

Existing drilling devices can be criticized inasmuch as there are no devices which simultaneous include a guide for the tool (guarantee of roundness, cylindricity and squareness), a depth stop, damping and suction-type extraction during manual drilling. Furthermore, some drilling devices require long tools, and this in turn leads to high consumption costs. In addition, expensive hardened drill bushes are usually required to guide the tools. A further important critical point is the fact that the stroke, or more precisely the adjustment range, of the existing devices is too small and too inflexible for some tasks and usually there is not a good view of the machining point. Finally, the existing devices are in need of improvement in terms of handling and ergonomics.

Therefore there is a need for a reliable manual drilling apparatus for use with materials or material composites, in particular with a view to reducing delamination (working loose of individual fibers from the bonding resin) and burr formation, preventing tool breakages and cutting-edge and cutting-corner chips and complying with required diameter tolerances, with the simultaneous suction-type extraction of chips and dusts arising. Further, there is a need for an apparatus for use with the following processes: full drilling, redrilling, reaming, counterboring, drilling of blind holes, drilling of through-holes and combinations of these processes. The present invention fulfills these needs and provides other related advantages.

SUMMARY OF THE INVENTION

The problem of the invention is to improve a device of the type mentioned at the outset such that it becomes possible to carry out manual drilling with optimum conditions in terms of feed, compliance with predetermined drilling depth, keeping the drilling-point clean, compliance with work safety regulations in terms of dust pollution, and with optimum compliance with the drilling requirements in terms of dimensional accuracy and compliance with squareness and roundness of the holes and freedom of the hole edge from burr formation, delamination, chips, whereby drilling, reaming or counterboring tools are to be used as the tool.

The essential features of the invention compared with the prior part are as follows:

guidance (guarantee of roundness, cylindricity and squareness), adjustable damping, adjustable feed path/depth stop and suction-type extraction in one device guidance of the tools at a predeterminable angle (e.g. 90°, 45° or suchlike) to the workpiece surface without expensive drill bushes, although the use of drill bushes is optionally possible arrangement of the linear guide at least partially in the peripheral area of the drilling machine, so that a large construction length is not required reliable suction-type extraction of chips and dusts short tools or ones that are available as standard automatic lubrication of tools good view of drilling point better manipulation and ergonomics construction volume and optional pipe as grip maintenance-friendly The use of the present device for manual drilling is suitable in many fields. Thus, a typical case of application can be seen in aircraft construction and aircraft assembly for producing rivet holes. In this case, work would take place with materials whose dusts arising during drilling work are hazardous to health (e.g. CFRP, FRP, Glare), metallic materials (e.g. aluminum, titanium, steel), as well as composites of said materials. It emerges precisely in manual drilling work with high-strength materials such as titanium, for example, that the drilling device, through the damping and the associated uniform feed motion, contributes towards greatly reduced wear of hard-metal tools due to forced breakages and forced chipping. Furthermore, the device can be used advantageously in the machining of brittle materials (e.g. chipboard, gypsum, glass) in order to avoid chips at the edges of holes.

However, since the machining of, for example, derived timber products and plastics is also possible with the device, other areas of application for the present drilling device lie in the building trade and the shipbuilding industry, in the furniture industry, the wind-energy industry, in the do-it-yourself sector and in general handicraft work, because here too there is the problem of the screwing-through of tools at the tool exit through the material and the formation of chips and dusts which have to be extracted by suction.

The invention provides a device for manual drilling with integrated depth stop, damping and suction-type extraction, for the guidance of drilling, reaming and counterboring tools at any angle to the workpiece surface.

According to the invention, the device for manual drilling is used for machining metallic materials (e.g. aluminum, steel, titanium) and/or plastics (e.g. PVC (polyvinyl chloride)) and/or composite materials (e.g. CFRP (carbon-fiber reinforced plastics), RFP (fibrous-glass reinforced plastics), AFRP (aramid-fiber reinforced plastics), Glare (glass fiber reinforced aluminum)) and/or derived timber products (e.g. natural wood/chipboard) and/or laminated composite materials consisting of any combinations of the aforementioned materials.

The present invention is direct to a device for a manual drilling machine having a casing, a grip, a tool chuck and a drilling, reaming or counterboring tool. The device comprises a workpiece jigging device having least one contact surface. A guide device is also present for the parallel guidance of the tool and the casing. Such parallel guidance is necessary when there is a displacement of the workpiece jigging device along a displacement path relative to the casing, said displacement path being parallel with a tool axis. Finally, a control device is included for the control of the displacement of the workpiece jigging device relative to the casing. The control device is applies different amounts of restraining force in sections along the displacement path. The restraining force varies along the displacement path dependent upon a rate of displacement and an amount of displacement.

The control device is comprised of a regulatable impact damper arranged radially off-centre parallel to the tool axis. The regulatable impact damper comprises a hydraulic or pneumatic impact damper, a rubber damper, or a combination of dampers and springs arranged radially off-centre parallel to the tool axis. The hydraulic or pneumatic damper is controllable to apply a variable restraining force that follows a characteristic curve.

When springs are present, each spring is arranged radially around and parallel to the guide device. The device includes a depth stop at an end point of the control device. Specifically, the depth stop corresponds to an end point of the impact damper. The depth stop may be rubber-cushioned.

The device slidingly engages the drilling machine or is integrated into the drilling machine along the casing. The device may be rigidly connected with the drilling machine, which can be a pistol drilling machine electrically or compressed-air operated, or an angle drilling machine electrically or compressed-air operated, or a rod drilling machine electrically or compressed-air operated.

The device further comprises a semi-cylindrical fixing piece clamped behind a drill chuck or on a shaft of the drilling machine. The device mounts to the casing behind a drill chuck of the drilling machine via a pair of corresponding hollow cylinders formed in the device and the casing, into which a screw radially engages. The casing, a fixing piece, and a fixing counter-piece are conical to prevent axial slipping or twisting. The device is secured against axial slipping or twisting by engaging the screw radially in the casing and the fixing piece.

The guide device is formed by one or more linear guides arranged radially off-centre parallel to the tool axis, said linear guides being mounted in one or more guide bushes. The linear guides have a round cross-section, a hollow-cylinder cross-section, a triangular cross-section, a trapezoidal cross-section, a rectangular cross-section, a square cross-section, or a linear guide not completely enclosed. The linear guides are rotatable through at least 180° about the tool axis. The linear guides are formed by two or more hollow cylinders displaceable within one another and arranged parallel with the tool axis.

The device further includes a suction-type extraction device for conveying away and sucking away material chips, dusts and impurities from the action area of the workpiece jigging device. The suction-type extraction device comprises a suction pipe leading away laterally from the tool axis and fitted close to an extraction area near the tool. The suction-type extraction device comprises the suction pipe arranged radially off-centre and parallel to the tool axis and fitted close to the extraction area. The suction pipe is rotatable about the tool axis. The suction pipe functions as a second grip, which assists in the feed motion of the tool via the workpiece jigging device. A small air flow and an associated optimum suction-type extraction is achieved by a perforated plate/baffle plate fitted above the extraction area.

Two or more contact feet on the workpiece jigging device near the contact surface insure a vertical position or a predeterminable angle between the tool (14) and a workpiece surface. The contact feet are laterally adjustable to accommodate workpiece surfaces of varying size. The contact feet are independently adjustable along an axis parallel to the tool axis in order to insure a vertical position or a predeterminable angle on an uneven workpiece surface.

An opening is formed in the workpiece jigging device through which a view of the tool is provided, said opening being closed by a viewing window of glass or transparent plastic. The tool chuck is friction locked via a three-jaw chuck fitted on the drilling machine or a spring-chuck holder.

A drill bush, adapted to the diameter of the tool, is provided in the action area coaxial with the tool axis. The drill brush comprises hardened or non-hardened steel.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 3a is a cross-sectional view of a circular guide bolt from the present invention;

FIG. 3b is a cross-sectional view of a hollow, circular guide bolt from the present invention;

FIG. 3c is a cross-sectional view of a triangular guide bolt from the present invention;

FIG. 3d is a cross-sectional view of a trapezoidal guide bolt from the present invention;

FIG. 3e is a cross-sectional view of a rectangular guide bolt from the present invention;

FIG. 4 is a cross-sectional view of a coaxial guide from the present invention;

FIG. 5 is a cross-sectional view of the body of the workpiece jigging piece from the present invention;

FIG. 6 is a diagrammatic representation of the peripheral area of a drilling machine, in which the linear guide is arranged at least partially and which can optionally be used for a rotary adjustment of the device with respect to the drilling machine;

FIG. 13a is a schematic drawing of the device of the present invention applied to a composite layer material including springs on the guide arms;

FIG. 13b is a graph illustrating the linear restraining force relative to feed displacement of the springs;

FIG. 14a is a schematic drawing of the device of the present invention applied to a composite layer material including an impact damper;

FIG. 14b is a graph illustrating the rate dependent restraining force relative to feed displacement of the impact damper;

FIG. 15a is a schematic drawing of the device of the present invention applied to a composite layer material including an impact damper and a spring;

FIG. 15b is a graph illustrating the restraining force relative to feed displacement of the combination of the impact damper and the spring;

FIG. 16a is a schematic drawing of the device of the present invention applied to a composite layer material including serial impact dampers;

FIG. 16b is a graph illustrating the rate dependent restraining force relative to feed displacement of the serial impact dampers;

FIG. 17a is a schematic drawing of the device of the present invention applied to a composite layer material including a controllable damper; and FIG. 17b is a graph illustrating the rate dependent restraining force relative to feed displacement of the controllable damper.

DETAILED DESCRIPTION OF THE PREFERRED EMBODIMENT

As shown in drawings 1 through 17b for purposes of illustration, the present invention is concerned with a device 100 for guiding a manual drilling machine 10. More particularly, the present invention relates to a device 100 for regulating the feed force of a manual drilling machine 10 to avoid delamination, burs, and chips around a drilling site. The present invention also provides for the extraction of waste around a drilling site and a depth stop.

Figure 1:
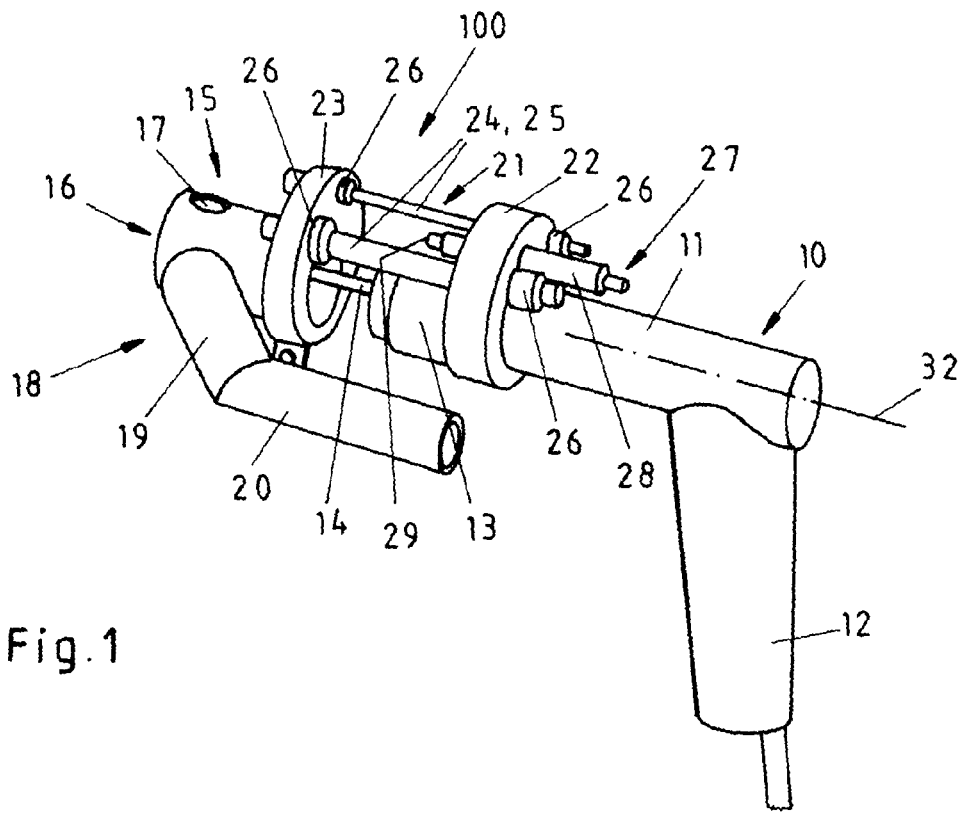
FIG. 1 is a perspective view of the device according to the present invention on a drilling machine in an initial position.
Figure 2:
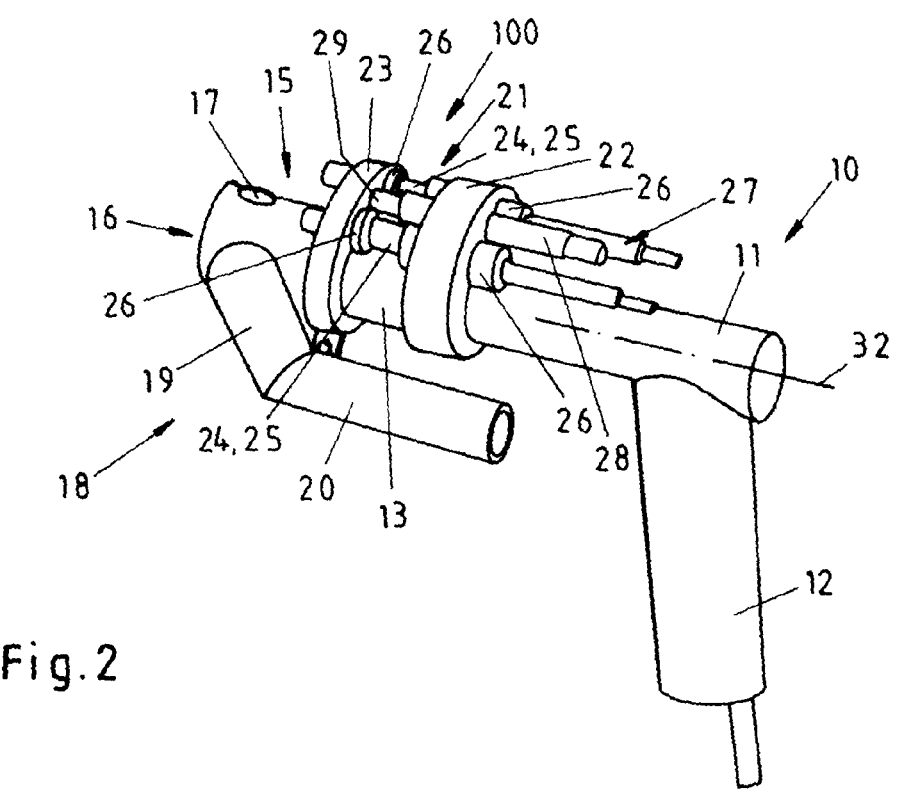
FIG. 2 is a perspective view of the device according to the present invention on a drilling machine in an end position.

FIGS. 1 and 2 show an example of and embodiment of a device 100, which is arranged on a drilling machine 10. This is a drilling machine 10 is known in the art for manual drilling, which in the usual way has a casing 11, a grip 12 and a tool chuck 13 for a tool 14. The tool 14 comprises a drill bit or similar tool for creating a hole, counterbore, groove or other similar structure, or reaming any such structure in a surface.

Device 100 consists of a workpiece jigging device 15, with a contact surface 16, which can have contact feet not shown in FIGS. 1 and 2. An opening 17 is made in workpiece jigging device 15 in order to be able to see the action area, i.e., the area where the tool 14 engages a surface. Also arranged on workpiece jigging device 15 is suction-type extraction device 18, which enables material chips, dusts and impurities to be conveyed via suction pipe 19 out of the action area of the workpiece jigging device 15. For this purpose, suction pipe 19 is provided with a connection piece 20, to which a tube (not shown) can be connected. In the form of embodiment shown in FIGS. 1 and 2, connection piece 20 is led parallel to the machine axis or tool axis and thus leads to a compact construction of device 100.

Guide device 21 has a fixing piece 22 as a connection body to drilling machine 10 and a fixing counter-piece 23 as a carrier of workpiece jigging device 15. Fixing piece 22 and fixing counter-piece 23 are connected via two axial, linear guides 24, which are designed as guide bolts 25 which are arranged in guide bushings 26 in fixing piece 22 and fixing counter-piece 23 respectively, so that parallel guidance to the tool axis is always guaranteed when there is a coaxial displacement of the workpiece jigging device 15.

Control device 27 is formed in this example of embodiment by an impact damper 28, which is arranged on fixing piece 22 and its action tip 29 is acted on by fixing counter-piece 23. In the example of embodiment shown in FIGS. 1 and 2, only guide device 21 acts initially in the starting position shown in FIG. 1. As the drilling machine 10 is applied to a material, the contact surface 16 engages a surface of the material. The workpiece jigging device 15 is freely displaced along the axis of the guide bolts 25 and the tool 14 until fixing counter-piece 23 engages the action tip 29 of impact damper 28. At this point, impact damper 28 is activated and the force of the feed motion is lessened by an amount equal to the damping force. The action of the impact damper 28 will be described more fully below.

Figure 12:
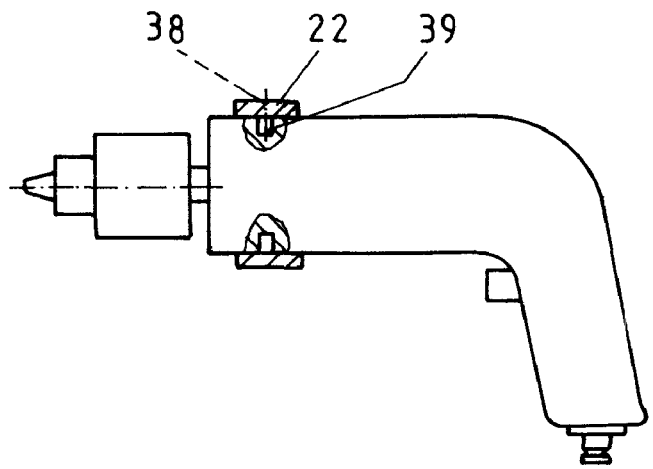
FIG. 12 is a side view illustrating the fixing with the use of screws.

Fixing piece 22 connects the drilling machine 10 rigidly with device 100. The drilling machine 10 may be any type commonly used in the art. Preferably, drilling machine 10 is a pistol-type device that is operated by electricity or compressed air. Device 100 is fitted on machine 10 in a rotatable manner. This allows the device to be adapted very flexibly to the ergonomic differences of workers (right/left-handed, size of hands, etc.) as well as to the spatial restrictions of the machining situation. A conical shape of the fixing piece 22 protects against axial slipping. Radial twisting is protected against by threaded holes into which headless screws 38 can be turned, which engage in matching blind holes 39 of the drilling machine 10. The threaded holes the headless screws 38 and the blind holes 39 are shown in FIG. 12.

Guide device 21 is formed by two or more linear guides 24 and/or guide bolts 25. The axial guides 24 may be formed by two or more hollow cylinders displaceable within one another and arranged coaxial with the machine and/or tool axis. Provision is further made such that the linear guides 24 are rotatable through at least 90° about the machine axis 32, and in particular rotatable through at least 180° about the tool axis 32 in the case of a pistol and rod drilling machine. Optimum adaptability of the machine to the given application can thus be achieved.

As described above, the linear guides 24 and guide bolts 25 are each guided into fixing piece 22 via two maintenance-free, plastic, insert bushings 26. As a result of the fact that compression springs 40 (illustrated in FIG. 13a) are arranged on linear guides 24, workpiece jigging device 15 is always carried back to the initial position when released. End caps (not shown) cushioned with rubber gaskets prevent the fixing piece 22 and the fixing counter-piece 23 from sliding off of the ends of the linear guides 24 due to the force of the compression springs 40.

Suction-type extraction device 18 is formed by suction pipe 19 which is positioned on workpiece jigging device 15. For the suction-type extraction, there is provided on suction pipe 19 a hollow grip connection piece 20 through which the waste materials (i.e., dust, chips, etc.) from the action of the tool 14 may be sucked away. Due to the fact that suction pipe 19 is attached to workpiece jigging device 15, the whole extraction system can be rotated with the grip connection piece 20 into the position that is ergonomically most convenient in each case.

The suction pipe 19 leads away laterally from the tool axis and is fitted close to the action point, i.e. the penetration point of the tool into the workpiece. Provision can be made such that the suction pipe 19 can be used as a grip. However, in order to ensure that the high forces caused by the holding of the drilling machine and by the drilling itself do not lead to tilting of the device, provision can be made such that the suction-type extraction is effected by a suction pipe 19 fitted close to the action point and running radially off-centre and parallel to the machine and/or tool axis 32.

An air baffle 30 (shown in FIG. 5) is also provided in workpiece jigging device 15 in order to guarantee better suction-type extraction. For the secure and vertical positioning of workpiece jigging device 15 on the workpiece, a relatively flat end surface is provided that is separated into multiple sections by vertical slits 31 to create feet 42 that engage the working surface. These feet 42 allow the workpiece jigging device 15 to rest level on a level surface. Finally, a view hole 17 is provided for a view of the drilling tool 14 in the action area.

Provision is made such that the device 100 has an integrated feed path adjustment, or more precisely an integrated depth stop. This can easily be achieved according to the invention in that, as an alternative to a separate stop as the depth stop, the endpoint of the damping device or spring device is used. As will be described more fully below, the depth stop is essentially formed by the workpiece jigging device, the guide device and the control device.

The core of the device 100 is formed by the impact damper/feed brake 28, which can be screwed into fixing piece 22. The impact damper 28 provides adjustable damping of the rate at which the drill machine 10 is moved forward along its displacement path 44. In the embodiment shown in FIGS. 1 and 2, the displacement path 44 coincides with the central axis 32 of the drill machine 10. There are other situations wherein the feed path 44 will not coincide with the central axis 32 of the drill machine 10. The impact damper 28 also provides an end stop for the movement of the workpiece jigging device 15 along the displacement path 44. The action of the impact damper 28 provides for a controlled and uniform exit of the tool 14 from a working surface.

On account of the small construction volume, the described example of embodiment of the invention may be very light, typically about 650 g in total weight.

The tool 14 can be clamped in a standard three-jaw chuck 13 found on most drilling machines 10 without risk of damage and without the device 100 having to be removed from the drilling machine 10.

FIGS. 3 to 5 show more detail of the parts of device 100 as shown in FIGS. 1 and 2. As can be seen from FIGS. 3a through 3e, the cross-section profile of guide bolts 25 can be designed as circular (FIG. 3a), as a hollow-cylinder (FIG. 3b), as a triangle (FIG. 3c), as a trapezoid (FIG. 3d) or as a rectangle or square (FIG. 3e). It is also possible to use a telescoping guide bolt 25 (as shown in FIG. 4) instead of a continuous guide bolt (as illustrated in FIGS. 1 and 2).

A close-up of the design of workpiece jigging device 15 is shown in FIG. 5. As shown in cross-section, jigging device 15 is provided with suction pipe 19, in combination with baffle/plate 30 acting as an air baffle, which provides for the suction type extraction of all impurities occurring when workpiece jigging device 15 is placed on a workpiece and tool 14 engages a surface. Vertical slits 31 in the end of the jigging piece 15 separate the end of jigging piece 15 in multiple sections to create feet 42 to engage the work surface as described above. These slits also provide for a corresponding inflow of fresh air in order to enable extraction of impurities via suction pipe 19.

As illustrated in FIG. 6, the device 100 is rotatably adjustable around the tool or machine axis 32. The adjustment occurs between the drilling machine 10 and the fixing piece 22. The device 100 may rotated through the range V indicated in FIG. 6 to accommodate varying conditions and users.

Figure 7:
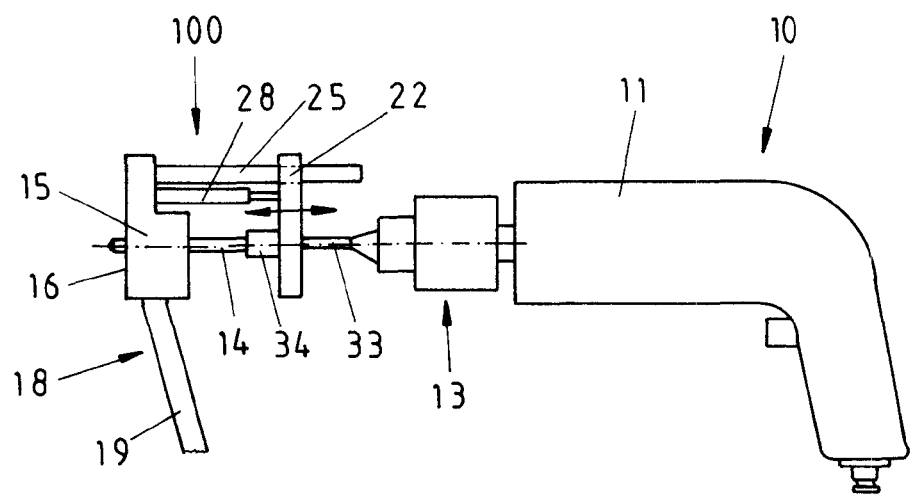
FIG. 7 is a side view of the device used with a pistol drilling machine where the tool is passed through a bearing.
Figure 8:
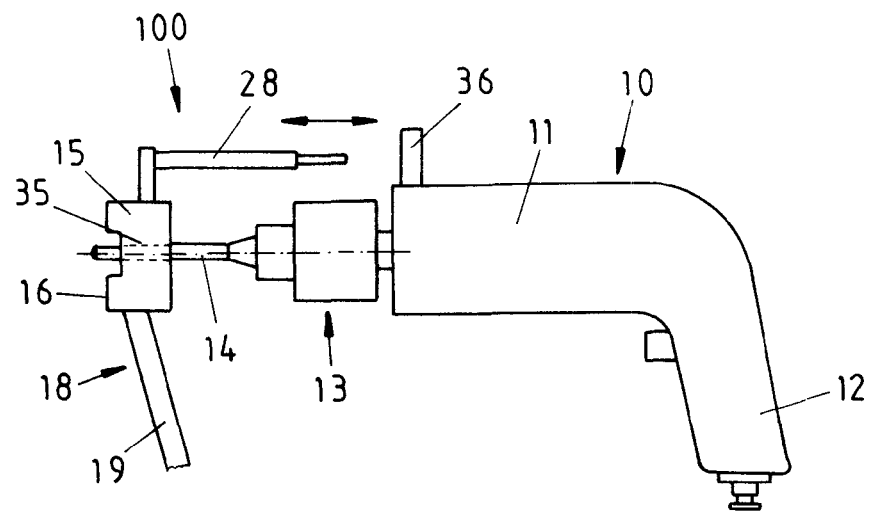
FIG. 8 is a side view of the device used with a pistol drilling machine where the tool is passed through a drill bush.

FIGS. 7 and 8 show two further embodiments of device 100, whereby an arrangement as a separate component on a pistol drilling machine is provided. In the embodiment shown in FIG. 7, there is clamped in tool chuck 13 a shaft 33. This shaft 33 is mounted in fixing piece 22 and carries a spring chuck 34. Tool 14 is clamped into spring chuck 34. The interactions of workpiece jigging device 15, fixing piece 22, spring chuck 34 and shaft 33 are guided via guide bolts 25 and damped via impact damper 28. Workpiece jigging device 15 has a contact surface 16 and suction-type extraction device 18. Provision is made such that the device can be held with the second hand by means of suction pipe 19.

In the embodiment shown in FIG. 8, tool 14 is clamped in the drilling machine 10 by means of tool chuck 13 and is guided through drill bush 35 mounted on workpiece jigging device 15. The damping takes place through the interaction of impact damper 28 mounted on the jigging device 15 and stop 36 mounted on the drilling machine 10. Workpiece jigging device 15 includes contact surface 16, a drill bush 35 and suction-type extraction device 18. Provision is also made here such that the device can be held with the second hand.

Figure 9:
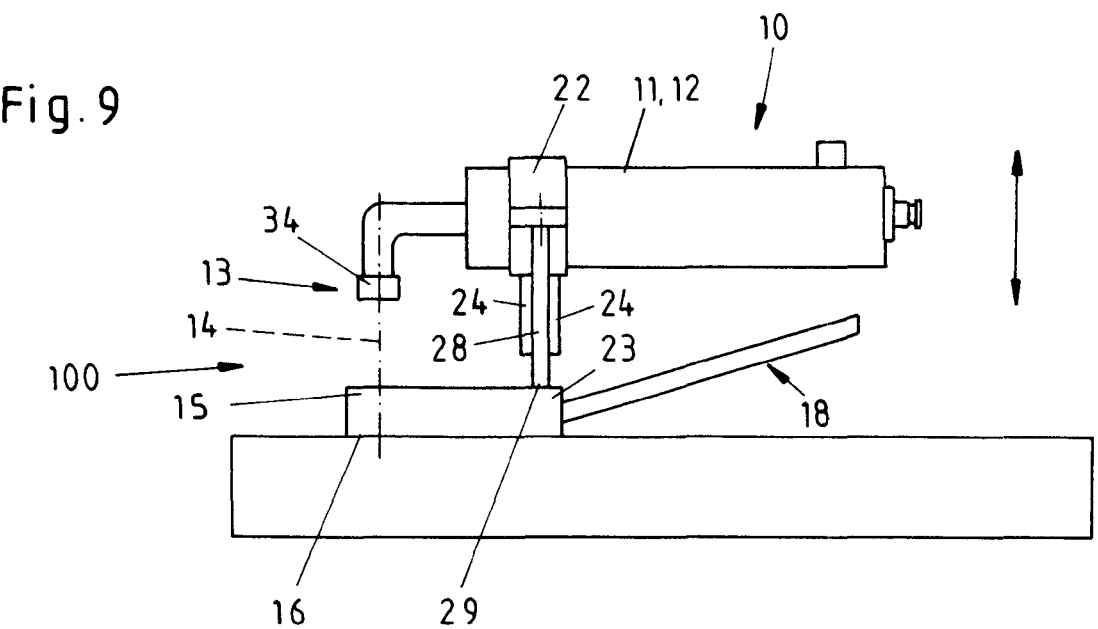
FIG. 9 is a side view of the device on an angle drilling machine.

FIG. 9 shows the adaptation of device 100 to an angle drilling machine. With this form of embodiment, drilling machine 10 and tool 14 are guided by two linear guides 24 at the side of the machine. Impact damper 28 is arranged between linear guides 24 and presses with its action tip 29 against workpiece jigging device 15 and is thereby supported on drilling machine 10. Workpiece jigging device 15 has contact surface 16, and a suction type extraction device 18. This embodiment may also include a drill bush (not shown).

Figure 10:
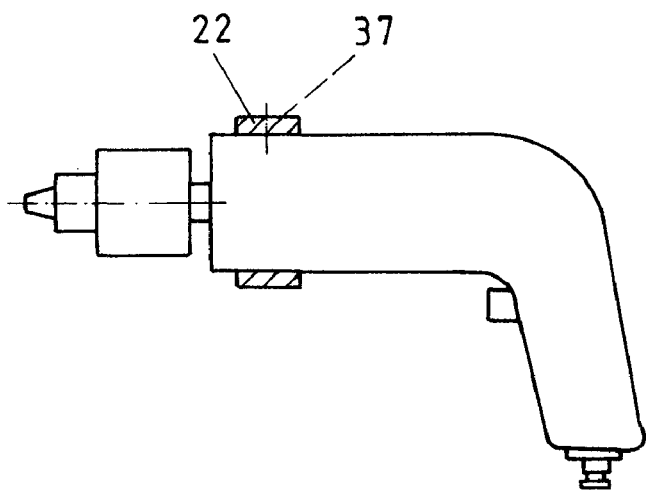
FIG. 10 is a side view illustrating the fixing of the device on a pistol drilling machine.
Figure 11:
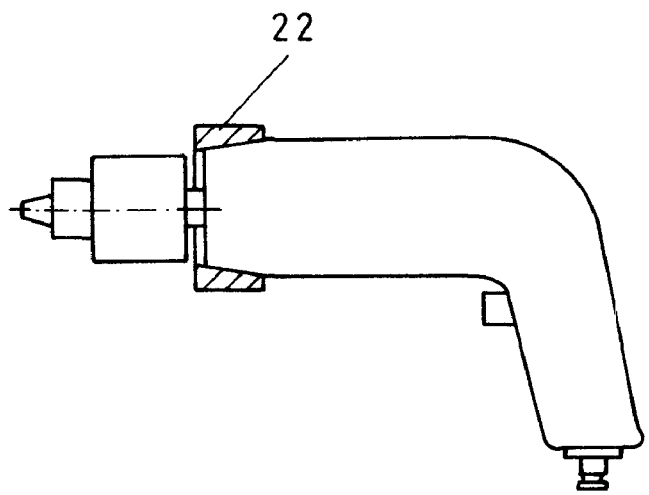
FIG. 11 is a side view illustrating the fixing of the device with a conical profile.

In view of the various possibilities for the arrangement of device 100 via fixing piece 22, FIGS. 10 to 12 show different configurations of fixing piece 22 in adaptation to the various forms of casing 11 of a drilling machine 10. Provision is made in FIG. 10 such that the fixing of device 100 takes place by means of a screw 37. In the arrangement according to FIG. 11, fixing piece 22 is provided with a conical profile and is slid in a clamping manner onto casing 11 of drilling machine 10. In the form of embodiment according to FIG. 12, fixing piece 22 is fixed by means of headless screws 38 which are screwed into blind holes 39.

According to a preferred form of embodiment, provision is made such that the control device 27 is a damping device and/or a spring device. A large number of different damping or spring devices are conceivable here, and also in combination. It has proved advantageous when the damping is adjustable in dependence on the displacement path. Particularly high damping in the area of the exit of the tool 14 from the workpiece is thus advantageous, more precisely with a view to avoiding delamination (working loose of individual fibers from the bonding resin), burr formation and chips. It is not desirable here for the feeding force raised due to damping to be effective over the whole displacement movement, because the physical burden on the worker would thus be greatly increased.

When drilling laminated composites, a low level of damping is often sufficient in the respective transitions between the material layers. In order to meet these different requirements, provision is made according to the invention such that a hydraulic impact damper, which can be regulated, or two or more hydraulic impact dampers 28 connected in series, which can be regulated, are arranged. Two or more impact dampers 28 can also be arranged in parallel. By connecting several impact dampers 28 in series, it is possible for example to establish optimum behavior when using a drilling device provided with the device 100 according to the invention on a composite material that is always the same, in such a way that easy penetration of the material composite is enabled and a high level of damping is achieved in the area of the tool exit. The impact dampers 28 can be arranged radially, off-center and parallel to the machine and/or tool axis. Preferably, the impact dampers 28 are provided as separate and replaceable components, in order to enable easy replacement in the event of wear and easy replacement when adapting to the given work process. It is also conceivable for the impact dampers 28 to be one or more hydraulic or pneumatic dampers optionally with an adjustable characteristic, one or more rubber dampers or a combination device consisting of dampers and springs. It is also conceivable here, for example, for different dampers and/or springs to be connected in series—one behind the other—in order to achieve a certain resistance characteristic with the displacement motion. It is also conceivable for the damping device to be designed as feed damping by mechanical friction of two friction partners, which are arranged radially, off-center and parallel to the machine and/or tool axis.

FIGS. 13a through 17b illustrate various embodiments of damping devices of the inventive device 100 and corresponding feed displacement-force curves. The first embodiment illustrated in FIG. 13a is a device 100 that includes compression springs 40 associated with the linear guides 24 and guide bolts 25. The compression springs 40 are arranged around the linear guides 24 and guide bolts 25 and are positioned against a surface of the fixing piece 22. The compression springs 40 are configured such that they do not cover the entire distance between the fixing piece 22 and the fixing counter-piece 23 when the device 100 is in the initial position. As the fixing counter-piece 23 is moved linearly along the displacement path 44, there is an initial linear distance ($I_{f0}$) in which the compression springs 40 are not engaged. In this initial distance ($I_{f0}$), the force from the compression springs 40 does nothing to counter the feed displacement of the tool 14. After initial distance ($I_{f0}$), the springs 40 are engaged over a controlled distance ($I_{f1}$) until an end stop is engaged. In this controlled distance ($I_{f1}$), the feed displacement of the tool 14 is countered by the counter-force of the springs 40. The initial distance ($I_{f0}$) and controlled distance ($I_{f1}$) may both be calibrated to correspond to depths or thicknesses of composite layers 46 in a machined surface 48.

FIG. 13b illustrates the linear restraining force that is applied by the compression springs 40. Over the initial distance ($I_{f0}$) the restraining force is zero. Over the controlled distance ($I_{f1}$), the restraining force increases linearly in accordance with the feed displacement.

Figures 14A, 14B:
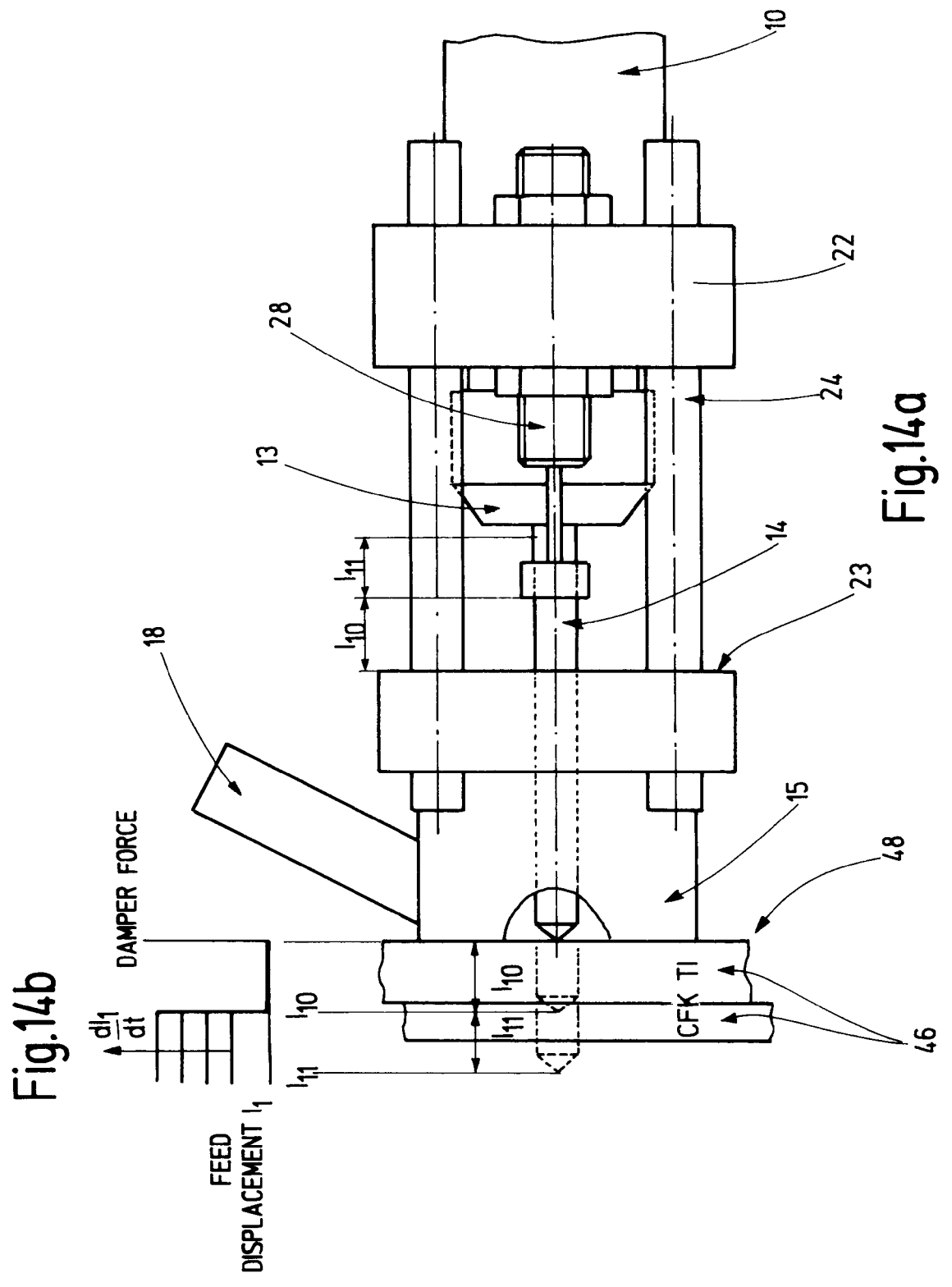

The second embodiment illustrated in FIG. 14a is a device 100 that includes one or more regulatable impact dampers 28 associated with the fixing piece 22. The impact dampers 28 are arranged around the perimeter of the fixing piece 22 as described above. The impact dampers 28 are configured such that they do not cover the entire distance between the fixing piece 22 and the fixing counter-piece 23 when the device 100 is in the initial position. In this embodiment, multiple impact dampers 28 have uniform length so that each is engaged simultaneously, i.e., in parallel. As will be more fully described below, the impact dampers 28 are regulatable in that the distance along the feed path at which a restraining force is applied may be varied.

As the fixing counter-piece 23 is moved linearly along the displacement path 44, there is an initial linear distance ($I_{f0}$) in which the impact dampers are not engaged. In this initial distance ($I_{f0}$), the force from the impact dampers 28 does nothing to counter the feed displacement of the tool 14. After initial distance ($I_{f0}$), the impact dampers 28 are engaged over a controlled distance ($I_{f1}$) until an end stop is engaged. As described above, this end stop can correspond to the impact damper 28 being fully compressed. In this controlled distance ($I_{f1}$), the feed displacement of the tool 14 is countered by the damper-force of the impact dampers 28. The initial distance ($I_{f0}$) and controlled distance ($I_{f1}$) may both be calibrated to correspond to depths or thicknesses of composite layers 46 in a machined surface 48 by adjusting the length of the impact dampers 28. In this way the impact dampers 28 are regulatable.

FIG. 14b illustrates the constant restraining force that is applied by the impact dampers 28. Over the initial distance ($I_{f0}$) the restraining force is zero. Over the controlled distance ($I_{f1}$), the restraining force increases to a constant amount dependent upon the rate of feed displacement ($dl_f/dt$). Assuming a constant rate of feed displacement ($dl_f/dt$), the restraining force at any given feed displacement will be constant.

The third embodiment illustrated in FIG. 15a is a device 100 that includes one or more impact dampers 28 and one or more compression springs 40. The impact dampers 28 and compression springs 40 are each individually configured as described in the first two embodiments. However, as illustrated in FIG. 15a, the impact dampers 28 may be configured such that they span the entire distance between the fixing piece 22 and the fixing counter-piece 23 when the device 100 is in the initial position, providing a constant damping force over initial distance ($I_{f0}$). After initial distance ($I_{f0}$), the springs 40 also engage the fixing counter-piece 23 over controlled distance ($I_{f1}$), providing a linearly increasing restraining force, until an end stop is engaged.

In this third embodiment, the impact dampers 28 provide a constant restraining force over the entire feed displacement, the initial distance ($I_{f0}$) plus the controlled distance ($I_{f1}$). The constant damping force from the impact dampers 28 counters the feed displacement of the tool 14. In the controlled distance, the constant damping force and the linearly increasing spring force combine to provide increased restraining force against the feed displacement of the tool 14. As described above, the end stop can correspond to the impact damper 28 being fully compressed. As illustrated, the initial distance ($I_{f0}$) and controlled distance ($I_{f1}$) may both be calibrated to correspond to depths or thicknesses of composite layers 46 in a machined surface 48.

FIG. 15b illustrates the combined constant, rate-dependent restraining force and the linearly increasing restraining force that is applied by the impact dampers 28 and springs 40. Over the initial distance ($I_{f0}$), the restraining force is a constant amount dependent upon the rate of feed displacement ($dl_f/dt$) that does not vary with feed displacement. Over the controlled distance ($I_{f1}$), the combined restraining force increases linearly from the constant restraining force by the amount of the restraining force.

The fourth embodiment illustrated in FIG. 16a is a device 100 that includes two or more impact dampers 28 associated with the fixing piece 22. The impact dampers 28 are configured as described above in the second embodiment. The one difference is that the multiple impact dampers 28 have staggered lengths such that each is engaged at different points along the feed path 44, i.e., in series. As the fixing counter-piece 23 is moved linearly along the displacement path 44, there is an initial linear distance ($I_{f0}$) in which none of the impact dampers 28 are engaged. In this initial distance ($I_{f0}$), the force from the impact dampers 28 does nothing to counter the feed displacement of the tool 14. After initial distance ($I_{f0}$), there is a first controlled distance ($I_{f1}$) in which one or more of the impact dampers 28 are engaged. There is then a second controlled distance ($I_{f2}$) in which one or more of the remaining impact dampers 28 are engaged. The device 100 may be configured to have more controlled distances by adding more impact dampers 28 at staggered levels. The device will keep moving along the feed path until the fixing counter-piece 23 engages an end stop. As described above, this end stop can correspond to the impact dampers 28 being fully compressed. In each of the controlled distances ($I_{f1}$) and ($I_{f2}$), the feed displacement of the tool 14 is countered by the damper-force of the impact dampers 28. The initial distance ($I_{f0}$) and controlled distances ($I_{f1}$) and ($I_{f2}$) may all be calibrated to correspond to depths or thicknesses of composite layers 46 in a machined surface 48.

FIG. 16b illustrates the constant restraining force that is applied by the impact dampers 28. Over the initial distance ($I_{f0}$) the restraining force is zero. Over the first controlled distance ($I_{f1}$), the restraining force increases to a constant amount dependent upon the rate of feed displacement ($dl_f/dt$). Over the second controlled distance ($I_{f2}$), the restraining force is increased by a constant amount again dependent upon the rate of feed displacement ($dl_f/dt$). Assuming a constant rate of feed displacement ($dl_f/dt$), the restraining force at any given feed displacement in the first controlled distance ($I_{f1}$) will be constant and the restraining force at any given feed displacement in the second controlled distance ($I_{f2}$) will be a combined constant damping force.

The fifth embodiment illustrated in FIG. 17a is a device 100 that includes one or more controlled impact dampers 28 associated with the fixing piece 22. The controlled impact dampers 28 are configured as described above in the second embodiment, wherein the controlled impact dampers 28 span the entire distance between the fixing piece 22 and the fixing counter-piece 23. However, the controlled impact damper 28 includes a feedback loop that includes a feed displacement measurement device 50, a control circuit 52, and a throttle 54. This feedback loop measures the amount of feed displacement and varies the restraining force applied based upon the amount of displacement. The restraining force follows a characteristic curve programmed into the control circuit 52 as regulated by the throttle 54.

As the fixing counter-piece 23 is moved linearly along the displacement path 44, there is an initial linear distance ($I_{f0}$) in which the control circuit 52 is programmed to apply no restraining force. After initial distance ($I_{f0}$), there is a controlled distance ($I_{f1}$) in which the control circuit 52 is programmed to apply a restraining force consistent with the characteristic curve programmed therein. This restraining force counters the feed displacement of the tool 14. The device 100 will keep moving along the feed path until the fixing counter-piece 23 engages an end stop, as described above. As above, the initial distance ($I_{f0}$) and controlled distance ($I_{f1}$) may all be calibrated to correspond to depths or thicknesses of composite layers 46 in a machined surface 48.

FIG. 17b illustrates the varying restraining force that is applied by the controlled impact dampers 28. Over the initial distance ($I_{f0}$) the restraining force is zero. Over the controlled distance ($I_{f1}$), the restraining force increases according to the characteristic curve that is programmed into the control circuit 52. The restraining force at any given feed displacement in the controlled distance ($I_{f1}$) will follow the characteristic curve as regulated by the throttle 54.

Although several embodiments have been described in detail for purposes of illustration, various modifications may be made without departing from the scope and spirit of the invention. Accordingly, the invention is not to be limited, except as by the appended claims.

What is claimed is:

1. A device (100) for a manual drilling machine (10) having a casing (11), a grip (12), a tool chuck (13) and a drilling, reaming or counterboring tool (14), comprising:

a workpiece jigging device (15) with at least one contact surface;

a guide device (21) for the parallel guidance of the tool (14) and the casing (11) when there is a displacement of the workpiece jigging device (15) along a displacement path relative to the casing (11), said displacement path being parallel with a tool axis; and a control device (27) for the control of the displacement of the workpiece jigging device (15) relative to the casing (11), said control device (27) being active at least in sections along the displacement path, wherein the control device (27) provides a variable restraining force along the displacement path dependent upon a rate of displacement and an amount of displacement.

2. The device according to claim 1, wherein the control device is comprised of a regulatable impact damper (28) arranged radially off-centre parallel to the tool axis.

3. The device according to claim 2, wherein the regulatable impact damper (28) comprises a hydraulic or pneumatic impact damper, a rubber damper, or a combination of dampers and springs arranged radially off-centre parallel to the tool axis.

4. The device according to claim 3, wherein the hydraulic or pneumatic damper is controllable to apply a variable restraining force that follows a characteristic curve.

5. The device according to claim 3, wherein each spring is arranged radially around and parallel to the guide device (21).

6. The device according to claim 1, wherein the device has a depth stop at an end point of the control device (27).

7. The device according to claim 6, wherein the depth stop corresponds to an end point of the impact damper (28).

8. The device according to claim 7, wherein the depth stop is rubber-cushioned.

9. The device according to claim 1, wherein the device (100) slidingly engages the drilling machine (10) or is integrated into the drilling machine (10) along the casing.

10. The device according to claim 9, wherein the device (100) is rigidly connected with the drilling machine (10), which can be a pistol drilling machine electrically or compressed-air operated, or an angle drilling machine electrically or compressed-air operated, or a rod drilling machine electrically or compressed-air operated.

11. The device according to claim 9, wherein the device (100) further comprises a semi-cylindrical fixing piece (22) clamped behind a drill chuck or on a shaft of the drilling machine (10).

12. The device according to claim 11, wherein the device (100) mounts to the casing behind a drill chuck of the drilling machine via a pair of corresponding hollow cylinders formed in the device (100) and the casing, into which a screw (37) radially engages.

13. The device according to claim 12, wherein the casing, a fixing piece, and a fixing counter-piece are conical to prevent axial slipping or twisting.

14. The device according to claim 13, wherein device (100) is secured against axial slipping or twisting by engaging the screw (37) radially in the casing and the fixing piece.

15. The device according to claim 1, wherein the guide device (21) is formed by one or more linear guides (24) arranged radially off-centre parallel to the tool axis, said linear guides being mounted in one or more guide bushes (26).

16. The device according to claim 15, wherein the linear guides (24) have a round cross-section, a hollow-cylinder cross-section, a triangular cross-section, a trapezoidal cross-section, a rectangular cross-section, a square cross-section, or a linear guide not completely enclosed.

17. The device according to claim 15, wherein the linear guides are rotatable through at least 180° about the tool axis.

18. The device according to claim 15, wherein the linear guides (24) are formed by two or more hollow cylinders displaceable within one another and arranged parallel with the tool axis.

19. The device according to claim 1, further comprising a suction-type extraction device (18) for conveying away and sucking away material chips, dusts and impurities from the action area of the workpiece jigging device (15).

20. The device according to claim 19, wherein the suction-type extraction device comprises a suction pipe (19) leading away laterally from the tool axis and fitted close to an extraction area near the tool (14).

21. The device according to claim 20, wherein the suction-type extraction device comprises the suction pipe (19) arranged radially off-centre and parallel to the tool axis and fitted close to the extraction area.

22. The device according to claim 20, wherein the suction pipe (19) is rotatable about the tool axis.

23. The device according to claim 22, wherein the suction pipe functions as a second grip, which assists in the feed motion of the tool (14) via the workpiece jigging device.

24. The device according to claim 20, wherein a small air flow and an associated optimum suction-type extraction is achieved by a perforated plate/baffle plate fitted above the extraction area.

25. The device according to claim 1, further comprising two or more contact feet on the workpiece jigging device (15) near the contact surface to insure a vertical position or a predeterminable angle between the tool (14) and a workpiece surface.

26. The device according to claim 25, wherein the contact feet are laterally adjustable to accommodate workpiece surfaces of varying size.

27. The device according to claim 26, wherein the contact feet are independently adjustable along an axis parallel to the tool axis in order to insure a vertical position or a predeterminable angle on an uneven workpiece surface.

28. The device according to claim 1, wherein an opening (17) is formed in the workpiece jigging device (15) through which a view of the tool (14) is provided, said opening being closed by a viewing window of glass or transparent plastic.

29. The device according to claim 1, wherein the tool chuck (13) is friction locked via a three-jaw chuck fitted on the drilling machine (10) or a spring-chuck holder.

30. The device according to claim 1, wherein a drill bush, adapted to the diameter of the tool, is provided in the action area coaxial with the tool axis.

31. The device according to claim 30, wherein the drill brush comprises hardened or non-hardened steel.

* * * * *